(12) United States Patent
Chun (10) Patent No.: US 11,461,927 B2
(45) Date of Patent: Oct. 4, 2022

(54) VEHICLE AND METHOD FOR CONTROLLING THEREOF

(71) Applicants: HYUNDAI MOTOR COMPANY, Seoul (KR); KIA MOTORS CORPORATION, Seoul (KR)

(72) Inventor: Sangwoo Chun, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 61 days.

(21) Appl. No.: 17/111,175

(22) Filed: Dec. 3, 2020

(65) Prior Publication Data
US 2021/0390734 A1 Dec. 16, 2021

(30) Foreign Application Priority Data
Jun. 11, 2020 (KR) .................. 10-2020-0071075

(51) Int. Cl.
*G06T 7/73* (2017.01)
*G06V 20/62* (2022.01)
*G06V 20/56* (2022.01)

(52) U.S. Cl.
CPC .............. *G06T 7/74* (2017.01); *G06V 20/56* (2022.01); *G06V 20/62* (2022.01); *G06T 2207/30252* (2013.01); *G06V 20/625* (2022.01)

(58) Field of Classification Search
CPC ...... G06V 20/56; G06V 20/58; G06V 20/582; G06V 20/584; G06V 20/586; G06V 20/588; G06V 20/62; G06V 20/625; G06V 20/63; G06V 20/635; G06K 9/00; G06T 7/13; G06T 7/60; G06T 7/62; G06T 7/70; G06T 7/73; G06T 7/74; G06T 2207/30252; G01C 11/04; G01C 11/06; G01C 11/08; G01C 11/12; G05D 1/0231; G05D 1/0246; G05D 1/0253
See application file for complete search history.

(56) References Cited

U.S. PATENT DOCUMENTS

| 11,010,922 | B1* | 5/2021 | Gingrich | ........... G06T 7/248 |
| 2018/0114337 | A1* | 4/2018 | Li et al. | ........... G06V 10/44 |
| 2020/0066145 | A1* | 2/2020 | Devor et al. | ........... G08G 1/054 |
| 2020/0126240 | A1* | 4/2020 | Tsai | ........... G06T 7/248 |
| 2021/0295080 | A1* | 9/2021 | Chen et al. | ........... G06T 3/60 |

FOREIGN PATENT DOCUMENTS

| KR | 10-2013-0123880 A | 11/2013 |
| KR | 10-2019-0020304 A | 2/2019 |

OTHER PUBLICATIONS

Machine translation of KR 10-2013-0123880 A (Year: 2013).*
Machine translation of KR 10-2019-0020304 A (Year: 2019).*

* cited by examiner

*Primary Examiner* — Andrew W Johns
(74) *Attorney, Agent, or Firm* — Slater Matsil, LLP (57) ABSTRACT

A vehicle and a control method thereof are provided. The vehicle may include a camera configured to acquire a front image of the vehicle; a storage configured to store an outline image of a reference license plate, and store location information including a position of a front vehicle based on a size of the outline image of the reference license plate, and a controller configured to recognize a license plate included in the front image, and determine a position of the front vehicle based on the license plate and the location information.

20 Claims, 10 Drawing Sheets

VEHICLE AND METHOD FOR CONTROLLING THEREOF

CROSS-REFERENCE TO RELATED APPLICATION(S)

The present application claims priority to and the benefit of Korean Patent Application No 10-2020-0071075, filed on Jun. 11, 2020, the entire contents of which is incorporated herein for all purposes by this reference.

TECHNICAL FIELD

The present disclosure relates to a vehicle and a control method thereof determining a position of a front vehicle.

BACKGROUND

Recently, various advanced driver assistance systems (ADAS) have been developed for autonomous driving for the convenience of the driver. In particular, as the autonomous driving market is expected to enter a full-fledged growth trend from 2020, research is actively underway.

As one of these, ACC (Adaptive Cruise Control) is being actively studied. The ACC is a system that allows the vehicle to travel while maintaining the speed without the driver's manipulation if the driver sets the desired speed. To this end, if there is a target vehicle ahead of the target control, it may be necessary to maintain the target distance through distance measurement.

If a laser is used for accurate distance measurement, associated cost may increase.

SUMMARY

The present disclosure provides a vehicle and controlling method capable of acquiring location information of a vehicle in front by recognizing a license plate included in an image acquired through a camera.

In accordance with an aspect of the present disclosure, a vehicle may include a camera configured to acquire a front image; a storage configured to store an outline image of a reference license plate, and store location information including a position of a vehicle in front according to a size of the outline image of the reference license plate, and a controller configured to recognize the license plate included in the front image, and determine the position of the front vehicle based on the license plate and the position information.

The controller may control the shape of the outline image of the license plate included in the front image to correspond to the shape of the outline image of the reference license plate.

The controller may be configured to maintain the recognition of the license plate based on the movement of the pixel when the movement of the pixels corresponding to the license plate is continuous.

The controller may be configured to determine the position of the front vehicle based on at least one outline image of the reference license plate corresponding to each of the left and right sides of the outline image of the license plate among the outline images of the reference license plate.

The controller may be configured to control the outline image of the license plate included in the front image to correspond to the outline image of the reference license plate based on an aspect ratio of the outline image of the license plate.

The controller may be configured to recognize the license plate when the size of the outline image of the reference license plate exceeds the size of the outline image of the license plate.

The controller may be configured to control the outline image of the license plate to correspond to the outline image of the reference license plate when the difference between the aspect ratio of the outline image of the license plate and the aspect ratio of the outline image of the reference license plate is less than or equal to a predetermined value.

The controller may be configured to control the outline image of the license plate to correspond to the outline image of the reference license plate when the ratio of the area containing letters in the outline image of the license plate is more than a predetermined value.

In accordance with an aspect of the present disclosure, a controlling method of a vehicle may include acquiring a front image; storing an outline image of a reference license plate; storing location information including a position of a vehicle in front according to a size of the outline image of the reference license plate; and recognizing the license plate included in the front image, and determining the position of the front vehicle based on the license plate and the position information.

Recognizing the outline image of the license plate may include controlling the shape of the outline image of the license plate included in the front image to correspond to the shape of the outline image of the reference license plate.

Recognizing the outline image of the license plate may include maintaining the recognition of the license plate based on the movement of the pixel when the movement of the pixels corresponding to the license plate is continuous.

Recognizing the license plate may include recognizing the license plate only when the size of the outline image of the reference license plate exceeds the size of the outline image of the license plate.

Recognizing the license plate may include controlling the outline image of the license plate included in the front image to correspond to the outline image of the reference license plate.

Recognizing the license plate may include recognizing the license plate when the size of the outline image of the reference license plate exceeds the size of the outline image of the license plate.

Recognizing the license plate may include controlling the outline image of the license plate to correspond to the outline image of the reference license plate when the difference between the aspect ratio of the outline image of the license plate and the aspect ratio of the outline image of the reference license plate is less than or equal to a predetermined value.

Recognizing the license plate may include controlling the outline image of the license plate to correspond to the outline image of the reference license plate when the ratio of the area containing letters in the outline image of the license plate is more than a predetermined value.

DRAWINGS

These and/or other aspects of the disclosure will become apparent and more readily appreciated from the following description of the exemplary embodiments, taken in conjunction with the accompanying drawings of which.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following description, like reference numerals refer to like elements throughout the specification. This specification does not describe all elements of the embodiments, and in the Field of the Invention to which an exemplary embodiment of the present invention pertains, there is no overlap between the general contents or the embodiments. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it may be directly or indirectly connected to the other element, wherein the indirect connection includes "connection via a wireless communication network".

Further, when a part "includes" or "comprises" an element, unless there is a particular description contrary thereto, the part may further include other elements, not excluding the other elements.

The terms first, second, etc. are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the present invention will be described with reference to the accompanying drawings.

Figure 1:
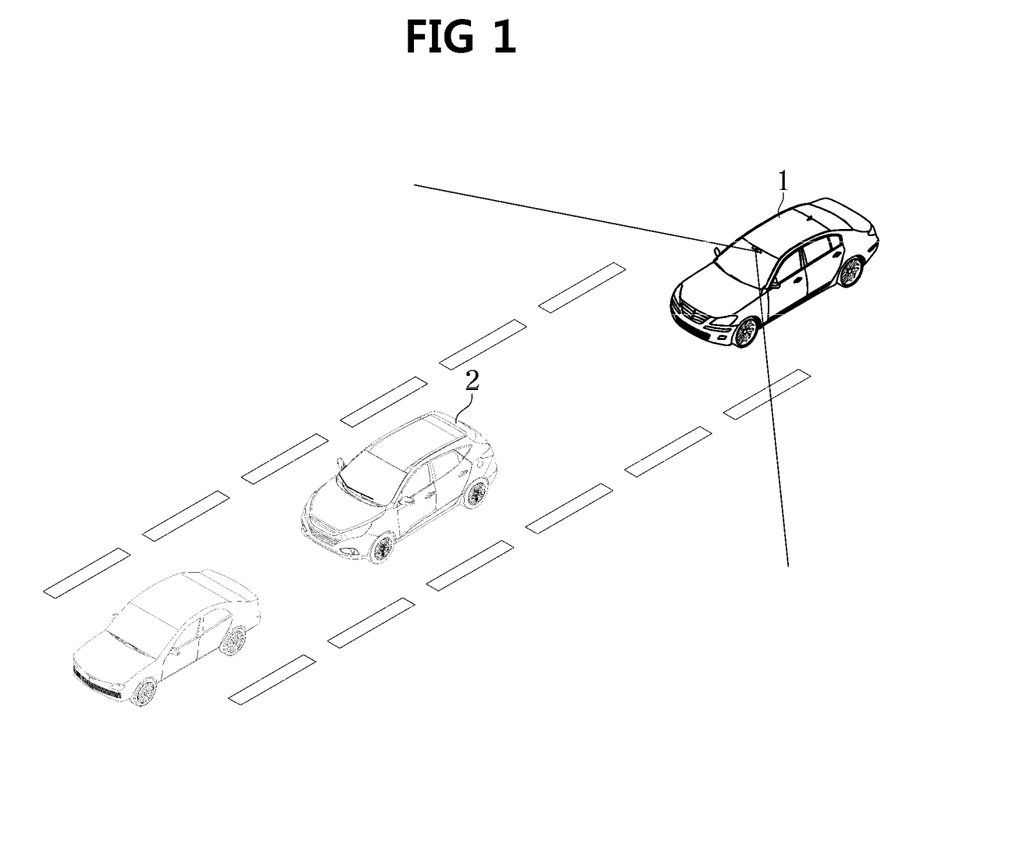
FIG. 1 is a diagram illustrating a positioning operation of a front vehicle in one form of the present disclosure.
Figure 2:
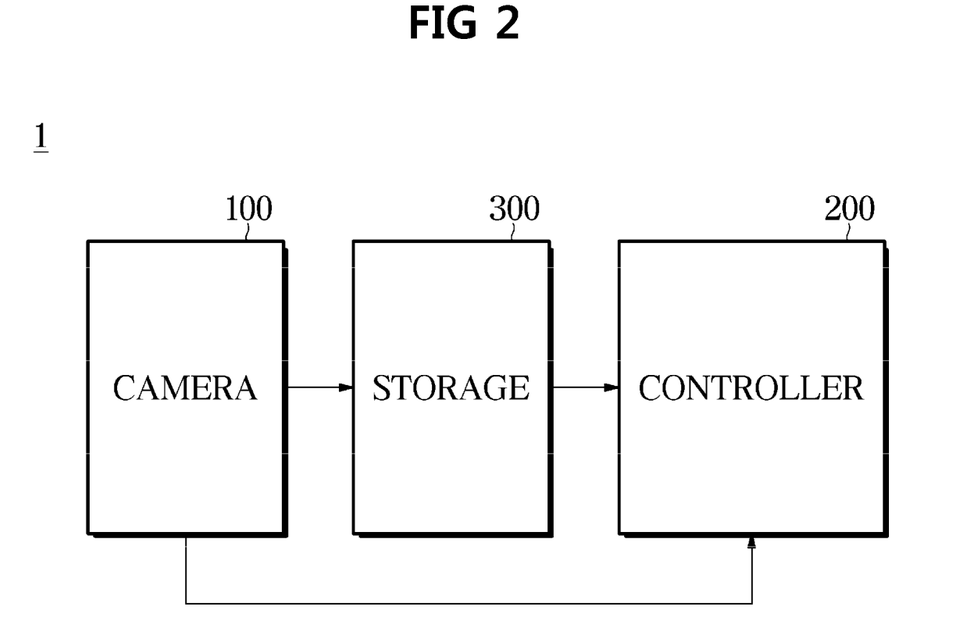
FIG. 2 is a diagram illustrating a control configuration of a in one form of the present disclosure.

FIG. 1 is a diagram illustrating a positioning operation of a front vehicle according to an embodiment. FIG. 2 is a diagram illustrating a control block diagram of the vehicle according to an embodiment.

Referring to FIGS. 1 and 2, the vehicle 1 may capture an image in front with the camera 100.

storage 300 receives an image from the camera 100 The storage 300 may store location information including a distance between the vehicle 1 and the vehicle 2 in front corresponding to the outline image of the reference license plate of the front vehicle and the outline image of the license plate of the front vehicle.

Here, the reference outline image of the license plate means the shape and size of the outline of the license plate.

The outline image of the reference license plate may vary in shape and size, such as by country and by type.

Here, the location information refers to the location of the vehicle in front of the vehicle 1.

The controller 200 acquires an image from the camera 100 and recognizes a license plate included in the image. A position of at least one front vehicle 2 positioned in front of the vehicle 1 may be determined based on the recognized license plate and the location information stored in the storage 300.

Recognizing the license plate can recognize the license plate by matching the outline image of the license plate included in the image with the outline image of the reference license plate. Recognizing a license plate can be equivalent to recognizing an outline image of a license plate.

The controller 200 measures and changes the size of the vehicle license plate in advance for each camera 100 specification, a condition in which the camera 100 is mounted on the vehicle, and a view angle. In addition, after measuring and changing the size of the license plate in advance, the vehicle distance parameter in front of the license plate size can be derived.

The controller 200 calculates the size by recognizing the outline image of the license plate of the front vehicle 2 measured while driving, and goes through a control method of calculating the distance of the front vehicle 2 according to each size and angle of view. At this time, based on the obtained information, when the front vehicle 2 rotates or is distorted in perspective, the rotation angle of the front vehicle 2 may be calculated using a license plate.

With the camera 100 fixed, the license plate of the front vehicle 2 is recognized for each position and distance, and the position of the license plate of the front vehicle 2 is converted into data accordingly. The controller 200 can create an algorithm to determine the location based on a large amount of data stored in the controller 200 storage 300.

The storage 300 may be implemented by at least one of Nonvolatile memory devices such as cache, Read Only Memory (ROM), Programmable ROM (PROM), Erasable Programmable ROM (EPROM), Electrically Erasable Programmable ROM (EEPROM), and Flash memory, or a volatile memory device such as random access memory (RAM), or a storage medium such as a hard disk drive (HDD, Hard Disk Drive) or CD-ROM but is not limited thereto.

The storage 300 may be a memory implemented as a separate chip from the processor described above with respect to the controller 200, or may be implemented as a processor and a single chip.

The controller 200 is a processor that controls all operations of the vehicle 1, and may be a processor of an electronic control unit (ECU) that controls overall operations of the power system. In addition, the controller 200 may control operations of various modules and devices built into the vehicle 1. According to an embodiment, the controller 200 may generate control signals for controlling various modules, devices, etc. built in the vehicle 1 to control the operation of each component.

The controller 200 may be implemented through at least one type of storage medium such as Flash memory type, Hard disk type, Multimedia card micro type, Card type of memory (e.g. SD or XD memory, etc.), RAM (Random Access Memory: RAM), Static Random Access Memory (SRAM), ROM (Read-Only Memory), EEPROM (Electrically Erasable Programmable Read-Only Memory), PROM (Programmable Read-Only Memory), Magnetic memory, Magnetic disk. However, it is not limited thereto, and may be implemented in any other form known in the art.

The vehicle 1 processes image data captured by the camera 100 or image data stored therein, and transmits the processed image data to the storage 300 and the controller 200. The data stored in the storage 300 is sent to the controller 200, and the controller may determine the location of the front vehicle 2 based on the data received from the storage 300 and the camera 100.

The camera 100 may capture an image in front of the vehicle 1 and acquire image data in front of the vehicle 1. The image data around the vehicle 1 may recognize at least one front vehicle 2 (a preceding vehicle traveling in the same lane) positioned in front of the vehicle 1.

The vehicle 1 may store data through storage 300 that stores location information indicating the distance between the vehicle 1 in front of the vehicle 2 and the vehicle 1 corresponding to the outline image of the reference license plate in the image.

At least one component may be added or deleted corresponding to the performance of the components of the vehicle illustrated in FIG. 2. In addition, it will be readily understood by those of ordinary skill in the art that the mutual positions of the components may be changed corresponding to the performance or structure of the system.

Meanwhile, each of the components illustrated in FIG. 2 may mean software and/or hardware components such as a Field Programmable Gate Array (FPGA) and an Application Specific Integrated Circuit (ASIC).

Figure 3:
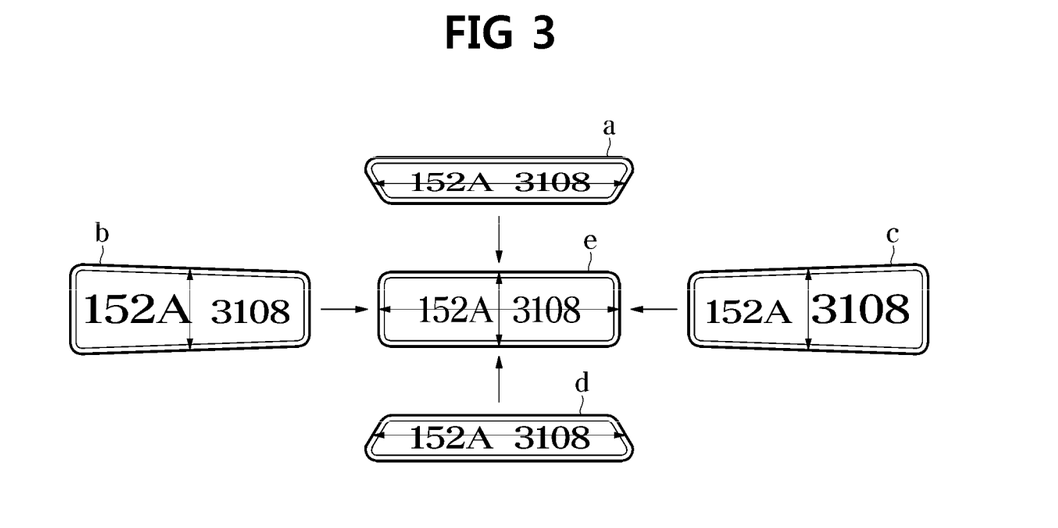
FIG. 3 is a diagram illustrating recognition of a license plate of a vehicle in one form of the present disclosure.

FIG. 3 is a diagram illustrating an operation of recognizing a license plate of a front vehicle 2 through a shape while driving according to an exemplary embodiment.

The controller 200 according to an embodiment may acquire a front image through the camera 100. The storage 300 can store the outline image of an existing license plate. In addition, the storage 300 may store location information including a distance between the vehicle 1 in front of the vehicle 2 including the reference license plate. The front image may be acquired through the camera 100 and an outline image of a license plate included in the front image may be recognized. The controller 200 can control the shape of the outline image of the license plate included in the front image to correspond to the closest shape among the outline images of the reference license plate.

Referring to FIG. 3 in detail, the outline image shape (a, b, c, d) of the license plate is also observed in which the shape of the outline image of the license plate is measured in various shapes rather than a rectangular shape according to the movement of the vehicle in front during driving. This can be observed in various ways depending on the degree of rotation or going uphill or downhill in the shape of the license plate viewed from the front. Therefore, the shape of the outline image of the license plate of various shapes can also be measured and changed in advance and saved as the outline image shape (e) of the license plate viewed from the front.

At this time, the reference license plate outline image may store not only the outline image shape (e) of the license plate viewed from the front, but also the outline image shape (a, b, c, d) of the license plate measured in various forms.

At this time, after storing the outline image of the reference license plate, the distance between the vehicle 1 and the vehicle 2 in front is calculated. Even if the license plate of the front vehicle 2 is measured to be deformed due to rotation and movement on a slope, one of the horizontal length or the vertical length of the license plate of the front vehicle 2 remains constant or changes, but does not change extremely. For example, in the case of b, it can be seen that the front vehicle 2 turns left, and it can be seen that the length of the outline image of the license plate is shorter on the right side than on the left. In this case, the position is determined by considering that the vehicle is turning left.

Figure 4:
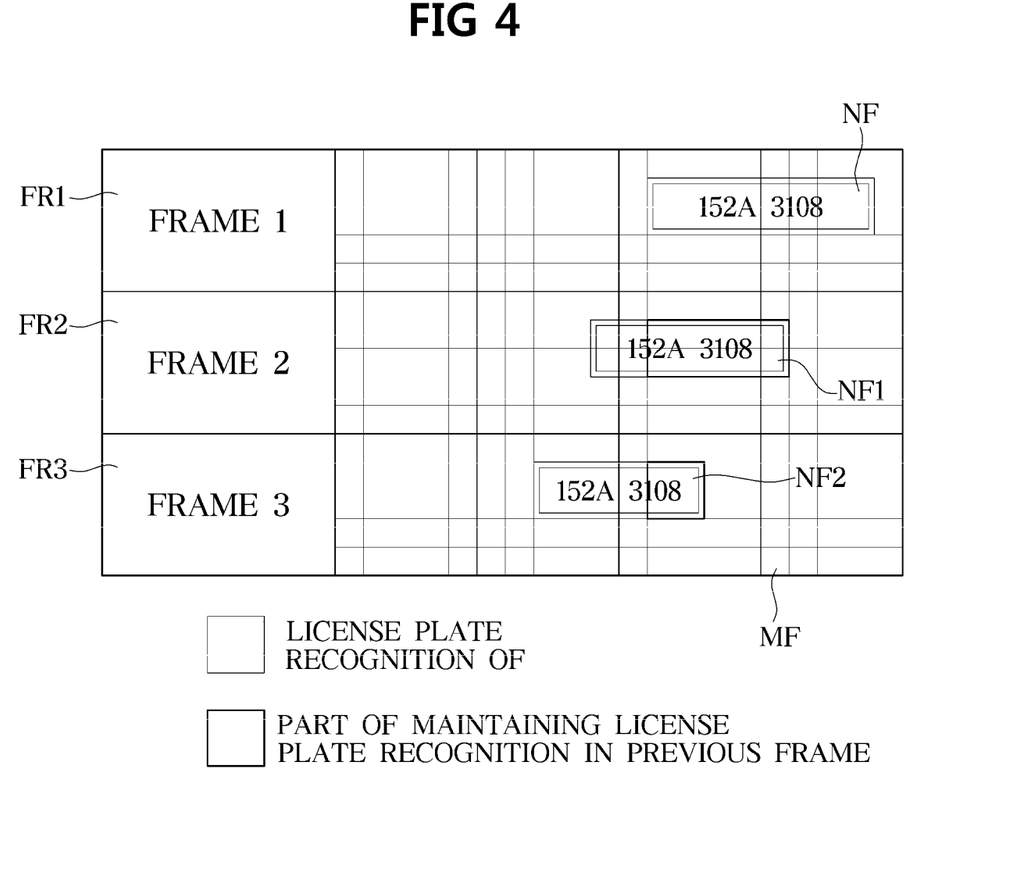
FIG. 4 is a diagram illustrating an operation of maintaining license plate recognition based on a movement of a pixel corresponding to a license plate of a front vehicle in one form of the present disclosure.

FIG. 4 is a diagram illustrating an operation of maintaining license plate recognition based on a movement of a pixel corresponding to a license plate of a front vehicle 2 while driving according to an exemplary embodiment.

The pixel MF may mean an element constituting a digital image.

The pixel MF has a square shape like a mosaic picture of a tile, and a digital image such as a monitor can be formed by a set of pixels MF.

Here, the movement of pixels corresponding to the license plate may mean movement of pixels corresponding to the outline image of the license plate.

The controller 200 may include using a pixel MF to maintain recognition of the license plate of the vehicle in front 2.

Referring to FIG. 4 in detail, first, the license plate NF of the front vehicle 2 can be recognized. Thereafter, the number plate recognition can be maintained while the pixels recognized by the license plate for each frame move continuously.

Specifically, FRAME1 (FR1) recognizes the license plate NF of the front vehicle 2, and as the front vehicle 2 turns left, the pixels NF gradually move to FRAME2 and FRAME3. When the pixel moves, the portion NF1 for recognizing the license plate gradually decreases. At this time, looking at the part that maintains the license plate in the previous FRAME, the license plate maintenance part in the previous FRAME of FRAME3 (FR3) according to the degree of further rotation of the vehicle in the part that recognizes the license plate in the previous frame (NF1) in FRAME2 (FR2) (NF2) will also change. When the portion where NF occupies the pixel MF gradually decreases so that the amount of reduction does not exceed a certain value, and there is a license plate maintenance portion in the previous frame, it is recognized as the existing license plate NF.

Figure 5:
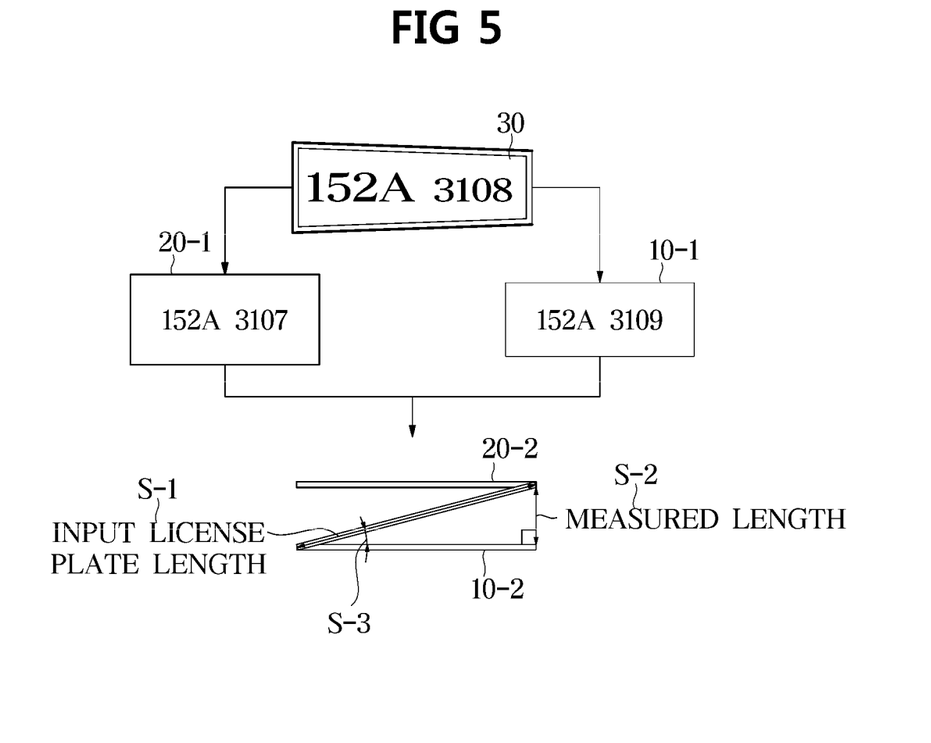
FIG. 5 is a diagram illustrating an operation of determining a position of a front vehicle by measuring lengths of left and right sides of an outline image of a license plate of a front vehicle in one form of the present disclosure.

FIG. 5 is a diagram illustrating an operation of measuring the lengths of the left and right sides of an outline image of a license plate of the front vehicle 2 while driving according to an embodiment, and determining a position of the front vehicle based on this.

According to an embodiment, the controller 200 determines the position of the front vehicle 2 based on the outline images of at least one reference license plate corresponding to each of the left and right sides of the outline image of the front vehicle 2 among the outline images of the reference license plate.

Referring to FIG. 5 in detail, when the front vehicle 2 turns left, the length of the left side of the outline image of the license plate of the front vehicle 2 is maintained, while the length of the right side gradually decreases. At this time, the controller 200 may determine the outline image 20-1 of the reference license plate corresponding to the length of the left side of the outline image of the front vehicle 2 license plate.

In addition, the controller 200 may determine an outline image (10-1) of the reference license plate corresponding to the length of the right side of the outline image of the first half vehicle license plate.

The controller 200 measures the length of each of the left and right sides of the outline image of the front license plate, and can determine the license plate most similar to the length of the vertical axis of the outline image of the license plate among the outline images of the reference license plate.

At this time, the length of the vertical axis of the outline image of the license plate corresponds to the length of the vertical axis of the outline image (20-1) of the reference license plate. The position of each front vehicle may be obtained based on at least one reference license plate outline image and location information.

The controller 200 uses the length of the outline image (10-2, 20-2) of the reference license plate corresponding to each side (10-1, 20-1) of the vehicle in front (2). The location of 10-2 and 20-2) can be known, and the distance S-2 between vehicles can be determined based on this.

The controller 200 may obtain the rotation angle S-3 through the distance S-2 between vehicles corresponding to the outline image of the at least one license plate and the input license plate length S-1 of the front vehicle.

The controller 200 may determine the position of the front vehicle 2 in the image by the license plate of the front vehicle 2 in the image based on the rotation angle S-3 and the distance S-2 between the vehicles.

This operation can be operated for the left and right as well as the upper and lower lengths as well.

Figure 6:
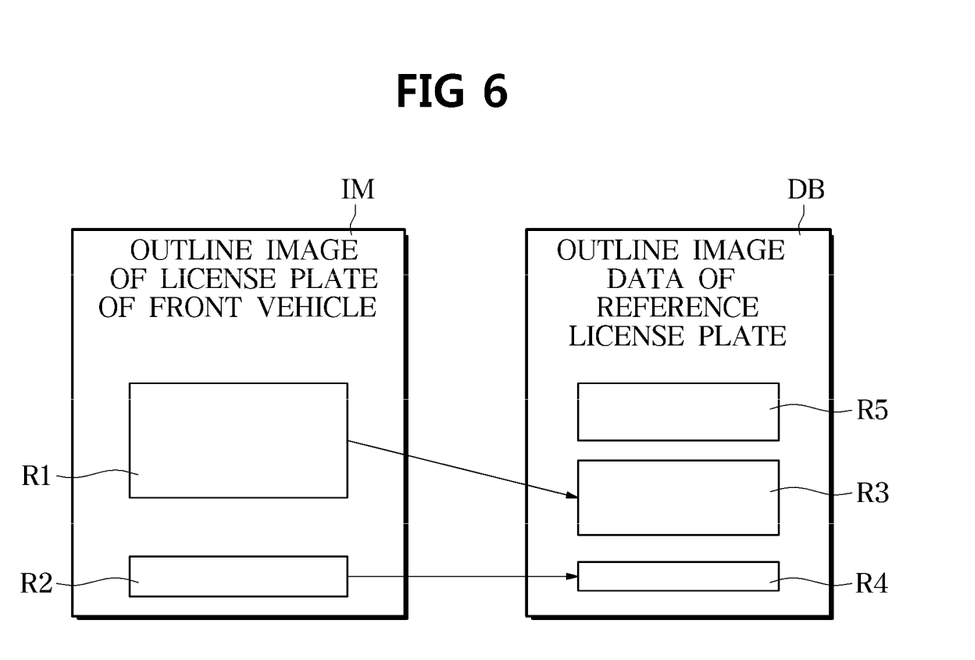
FIG. 6 is a diagram illustrating an operation of determining a position of a front vehicle based on an aspect ratio of an outline image of a license plate of a front vehicle in one form of the present disclosure.

FIG. 6 is a diagram illustrating an operation of determining a position of a front vehicle based on an aspect ratio of an outline image (IM) of a front vehicle license plate during driving according to an embodiment.

The aspect ratio of license plates can vary by country and by type.

Therefore, the controller 200 needs to distinguish each license plate in order to determine the distance by recognizing the outline image (IM) of the license plate in front of the vehicle.

Referring to FIG. 6, the controller 200 may measure the horizontal and vertical lengths of an outline image (IM) of the front license plate, and obtain an aspect ratio based on the measured horizontal and vertical lengths.

The controller 200 may pre-store outline image data (DB) for each type of reference license plate.

The controller 200 may control to correspond to the outline image data of the reference license plate based on the aspect ratio of the outline image (IM) of the front license plate in the image.

For example, when the controller 200 matches license plate 1 (R1) and license plate 2 (R2) with the outline image of the reference license plate, license plate 3 (R3) and license plate 4 (R4) with the outline image data (DB) of a plurality of reference license plates, each of which has an aspect ratio of license plate 1 (R1) and license plate 2 (R2) and the closest outline image aspect ratio of license plate will correspond with, and the License plate (R5) can be ignored. Ignoring means that the difference between the aspect ratio of the license plate image and the aspect ratio of the reference license plate image is remarkably large to prevent misrecognition, or that the ratio of the area containing letters in the outline image is too small to be used as data if it is not a license plate. That is, when the difference between the aspect ratio of the outline image of the license plate and the aspect ratio of the outline image of the reference license plate is less than a predetermined value, the outline image of the license plate can be controlled to correspond to the outline image of the reference license plate, and when the ratio of the area including letters among the outline images of the license plate is greater than or equal to a predetermined value, the outline image of the license plate may be controlled to correspond to the outline image of the reference license plate.

Figure 7:
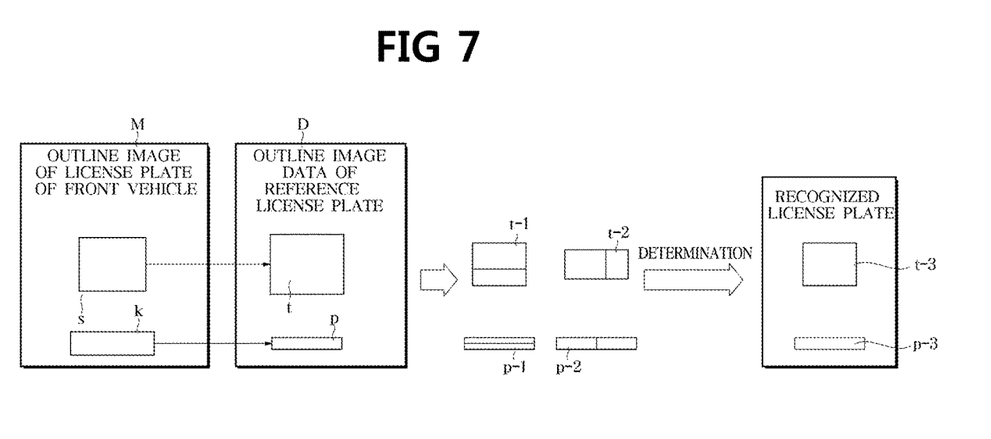
FIG. 7 is a diagram illustrating an operation of a vehicle recognizing the license plate only when the size of the outline image of the reference license plate exceeds the size of the outline image of the license plate during driving in one form of the present disclosure.

FIG. 7 is a diagram illustrating an operation of a vehicle recognizing the license plate only when the size of the outline image of the reference license plate exceeds the size of the outline image of the front license plate during driving according to an exemplary embodiment.

Referring to FIG. 7, the controller 200 may recognize the size of the outline image (M) of the license plate of the vehicle in front and compare it with the size of the outline image of the reference license plate stored in advance.

The controller 200 can recognize the license plate when the size of the outline image of the reference license plate in the outline image data (D) of the reference license plate exceeds the size of the outline image (M) of the license plate in the front vehicle.

The controller 200 may recognize the license plate when the outline image data D of the reference license plate previously stored is larger than the outline image M of the front license plate.

The license plate corresponding to the final size can be determined, and the position of the front vehicle 2 can be determined based on this.

At this time, as a first step process, the outline image (S,K) of the license plate in the image can be continuously detected.

The criterion for continuous detection is only when pixels are continuously moved for each frame.

The controller 200 can only consider the straight driving area to eliminate the possibility of misrecognition of road signs and off-road elements.

In the second step, the controller 200 compares the aspect ratio between the front license plate outline image (S,K) and the reference license plate outline image data (D). In comparison, the aspect ratio corresponds to the outline image (t,p) of the reference license plate.

And it can match the outline image (t-1, t-2, p-1, p-2) of the most approximate reference license plate.

In the third step, the controller 200 recognizes as a license plate when the size of the outline image of the reference license plate exceeds the size of the outline image of the license plate.

The controller 200 can determine the license plate recognized as close to the vehicle safety distance for safety.

Here, the determination means recognizing the license plate only when the size of the outline image of the reference license plate exceeds the size of the outline image of the license plate. The controller 200 can recognize as a license plate when the matching license plate in the outline image data of the reference license plate is larger than the size of the outline image of the license plate included in the image. This recognizes the license plate of the front vehicle having the closest aspect ratio among the outline image data of the reference license plate (t-3, p-3).

Specifically, referring to FIG. 7, When there is an outline image (t-1, p-2) of a license plate with a larger outline image size of the reference license plate than the outline image of the front license plate and an outline image (t-2, p-1) of a smaller license plate among the outline image data of the reference license plate (D) among the outline images of the license plate having an approximate aspect ratio, the outline image (t-1, p-2) of the license plate with a larger outline image size of the reference plate is selected. Only when the size of the outline image of the reference license plate is larger than the size of the outline image of the front license plate, the license plate is determined and recognized as the license plate of the vehicle in front (t-3, p-3), and the position of the vehicle in front (2) is determined through this.

Figure 8:
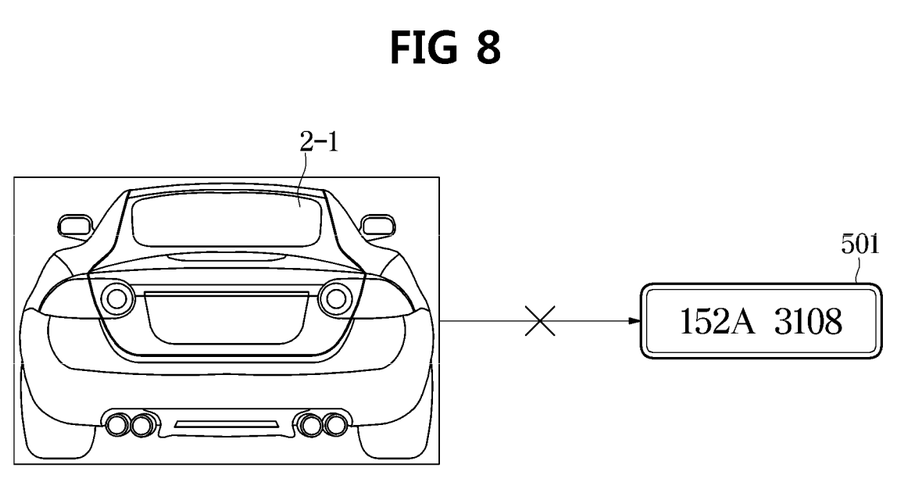
FIG. 8 is a diagram illustrating an operation of controlling to correspond to an outline image of the reference license plate based on a difference in aspect ratio of the outline image of the license plate in one form of the present disclosure.

FIG. 8 is a diagram illustrating an operation of controlling to correspond to an outline image of a reference license plate based on a difference in aspect ratio of an outline image of a license plate according to an embodiment.

The operation described in FIG. 8 is to determine a standard for recognizing a license plate in order to prevent excessive license plate recognition, and to prevent recognition as a license plate when it is out of the standard.

Referring to FIG. 8 in detail, the controller 200 may compare the aspect ratio by measuring the aspect ratio of the outline image of the license plate of the front vehicle 2 in the image and the outline image of the reference license plate.

If the difference in aspect ratio exceeds a predetermined value, the controller 200 incorrectly recognizes another item as a license plate, so it can be ignored without recognizing it as a license plate. That is, when the difference between the aspect ratio of the outline image of the license plate and the aspect ratio of the outline image of the reference license plate is less than or equal to a predetermined value, the outline image of the license plate may be controlled to correspond to the outline image of the reference license plate.

For example, when the camera captures the overall rear view (2-1) of the front vehicle 2 in the image, and the controller 200 recognizes the overall rear view (2-1) of the front vehicle 2 as a license plate shape, there is a large difference between the aspect ratio of the overall rear view (2-1) of the front vehicle 2 and the reference license plate aspect ratio. Based on this, the controller 200 can recognize it as something other than a license plate.

Therefore, when the difference in aspect ratio between the reference license plate outline image and the license plate outline image is large, the controller 200 may not recognize the overall rear view 2-1 of the front vehicle 2 as the license plate 501.

Figure 9:
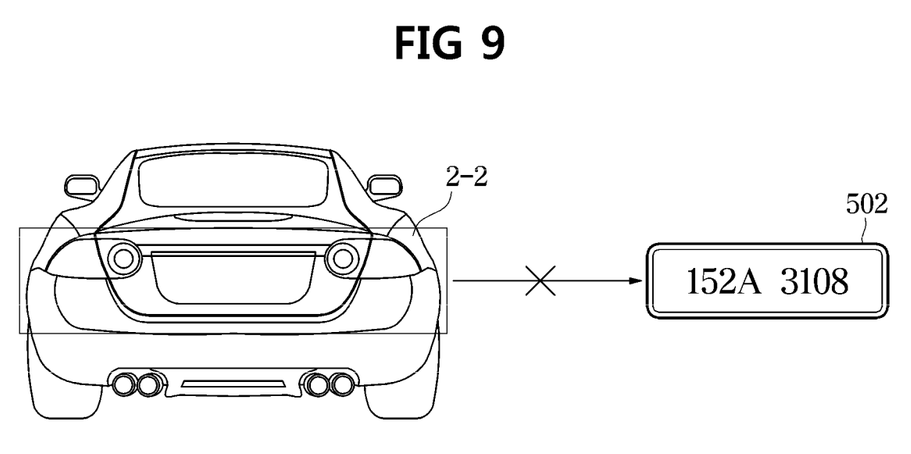
FIG. 9 is a diagram illustrating an operation of controlling so as to correspond to the outline image of the reference license plate based on a ratio of an area including letters among the outline images of the license plate in one form of the present disclosure.

FIG. 9 is a diagram illustrating an operation of controlling so as to correspond to the outline image of the reference license plate based on a ratio of an area including letters among the outline images of the license plate according to an embodiment.

Specifically, referring to FIG. 9, the controller 200 may erroneously recognize an image including the rear bumper 2-2 of the front vehicle 2 as an outline image of the license plate.

The controller 200 may perform an erroneous operation corresponding to the outline image of the reference license plate having an aspect ratio similar to the outline image of the license plate including the rear bumper.

The controller 200 may determine the ratio of the area containing letters in the outline image of the license plate to prevent the execution of such an erroneous operation.

The controller 200 may not recognize as the license plate 502 if the ratio of the area including the letters in the outline image of the license plate of the front vehicle 2 is less than a predetermined value.

That is, when the ratio of the area including letters among the outline images of the license plate is greater than or equal to a predetermined value, the outline image of the license plate may be controlled to correspond to the outline image of the reference license plate.

For example, based on the rear bumper (2-2) of a car, the number written "152 is 3109" is very low considering the overall area. This would be a very low number compared to the proportion of letters in the license plate. Therefore, the ratio of the letters in the license plate is set in advance, and if it is lower than that, the rear bumper (2-2) of a vehicle that does not recognize the license plate is not misrecognized as a license plate.

Figure 10:
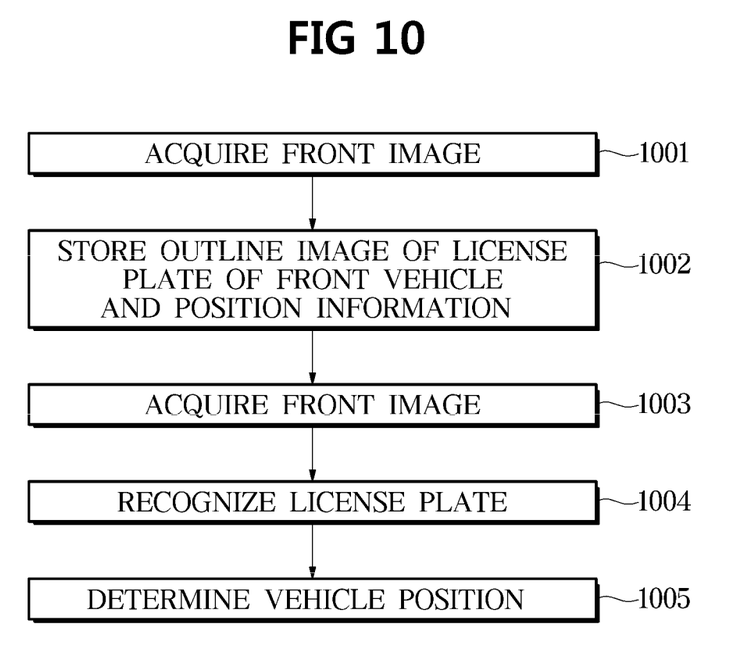
FIG. 10 is a flow chart in one form of the present disclosure.

FIG. 10 is a flowchart illustrating a method of controlling a vehicle according to an exemplary embodiment.

In FIG. 10, the camera 100 may acquire a front image (1001). The storage 300 stores (1002) an outline image of the license plate of the front vehicle 2 based on the image acquired by the camera, and stores it as an outline image of the reference vehicle license plate (1002). Position information including the distance between the vehicle in front 2 and the vehicle 1 according to the size of the reference license plate may be stored (1002). The controller 200 acquires a front image through the camera 100 (1003). In addition, the controller 200 may recognize the license plate included in the front image (1004). The controller 200 may determine the position of the vehicle in front based on the recognized license plate and position information (1005).

On the other hand, the above-mentioned exemplary embodiments may be implemented in the form of a recording medium storing commands capable of being executed by a computer system. The commands may be stored in the form of program code. When the commands are executed by the processor, a program module is generated by the commands so that the operations of the disclosed embodiments may be carried out. The recording medium may be implemented as a non-transitory computer-readable recording medium.

The non-transitory computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

In the vehicle and its control method according to an exemplary embodiment, a license plate included in an image recognized by a camera may be recognized to obtain accurate location information of a nearby vehicle.

What is claimed is:

1. A vehicle, comprising:
a camera configured to acquire a front image of the vehicle;
a storage configured to:
store an outline image of a reference license plate; and
store location information including a position of a front vehicle based on a size of the outline image of the reference license plate, and
a controller configured to:
recognize a license plate included in the front image, the license plate being recognized based on a pixel movement when the pixel movement corresponding to the license plate exceeds a predetermined level; and
determine the position of the front vehicle based on the license plate and the location information.

2. The vehicle according to claim 1, wherein the controller is configured to control a shape of an outline image of the license plate included in the front image to correspond to a shape of the outline image of the reference license plate.

3. The vehicle according to claim 2, wherein the controller is configured to determine the position of the front vehicle based on at least one outline image of the reference license plate of a plurality of outline images of the reference license plate corresponding to a left side of the outline image of the license plate or a right side of the outline image of the license plate.

4. The vehicle according to claim 1, wherein the controller configured to control the outline image of the license plate to correspond to the outline image of the reference license plate based on an aspect ratio of the outline image of the license plate.

5. The vehicle according to claim 4, wherein the controller is configured to recognize the license plate when a size of the outline image of the reference license plate exceeds a size of the outline image of the license plate.

6. The vehicle according to claim 4, wherein the controller is configured to control the outline image of the license plate to correspond to the outline image of the reference license plate when a difference between an aspect ratio of the outline image of the license plate and an aspect ratio of the outline image of the reference license plate is less than or equal to a predetermined value.

7. The vehicle according to claim 4, wherein the controller is configured to control the outline image of the license plate to correspond to the outline image of the reference license plate when a ratio of an area containing letters in the outline image of the license plate is greater than a predetermined value.

8. A method comprising:
acquiring, by a camera, a front image of a vehicle;
storing location information including a position of a front vehicle based on a size of an outline image of a reference license plate;
recognizing a license plate included in the front image, the license plate being recognized based on a pixel movement when the pixel movement corresponding to the license plate exceeds a predetermined level; and
determining the position of the front vehicle based on the license plate and the location information.

9. The method according to claim 8, wherein recognizing the license plate comprises controlling a shape of an outline image of the license plate to correspond to a shape of the outline image of the reference license plate.

10. The method according to claim 8, wherein recognizing the license plate comprises recognizing the license plate only when a size of the outline image of the reference license plate exceeds a size of the outline image of the license plate.

11. The method according to claim 8, wherein recognizing the license plate comprises controlling the outline image of the license plate to correspond to the outline image of the reference license plate.

12. The method according to claim 11, wherein recognizing the license plate comprises recognizing the license plate when a size of the outline image of the reference license plate exceeds a size of the outline image of the license plate.

13. The method according to claim 11, wherein recognizing the license plate comprises controlling the outline image of the license plate to correspond to the outline image of the reference license plate when a difference between an aspect ratio of the outline image of the license plate and an aspect ratio of the outline image of the reference license plate is less than or equal to a predetermined value.

14. The method according to claim 11, wherein recognizing the license plate comprises controlling the outline image of the license plate to correspond to the outline image of the reference license plate when a ratio of an area containing letters in the outline image of the license plate is greater than a predetermined value.

15. A method, comprising:
acquiring, by a camera, a front image of a vehicle;
storing location information including a position of a front vehicle based on a size of an outline image of a reference license plate;
recognizing a license plate included in the front image, wherein recognizing the license plate comprises recognizing the license plate only when a size of the outline image of the reference license plate exceeds a size of the outline image of the license plate; and
determining the position of the front vehicle based on the license plate and the location information.

16. The method according to claim 15, wherein recognizing the license plate comprises controlling a shape of an outline image of the license plate to correspond to a shape of the outline image of the reference license plate.

17. The method according to claim 15, wherein recognizing the license plate comprises controlling the outline image of the license plate to correspond to the outline image of the reference license plate.

18. The method according to claim 17, wherein recognizing the license plate comprises recognizing the license plate when a size of the outline image of the reference license plate exceeds a size of the outline image of the license plate.

19. The method according to claim 17, wherein recognizing the license plate comprises controlling the outline image of the license plate to correspond to the outline image of the reference license plate when a difference between an aspect ratio of the outline image of the license plate and an aspect ratio of the outline image of the reference license plate is less than or equal to a predetermined value.

20. The method according to claim 17, wherein recognizing the license plate comprises controlling the outline image of the license plate to correspond to the outline image of the reference license plate when a ratio of an area containing letters in the outline image of the license plate is greater than a predetermined value.

\* \* \* \* \*